United States Patent [19]

Eddy

[11] 4,378,134
[45] Mar. 29, 1983

[54] AIR BEARING GUIDE SYSTEM

[75] Inventor: Richard P. Eddy, Gardena, Calif.

[73] Assignee: Excellon Industries, Torrance, Calif.

[21] Appl. No.: 312,424

[22] Filed: Oct. 19, 1981

[51] Int. Cl.³ ............................................. F16C 32/06
[52] U.S. Cl. .................................. 308/3.5; 308/3 A; 308/5 R; 308/DIG. 1
[58] Field of Search ......... 308/3.5, 5 R, 3 A, DIG. 1, 308/9, 240

[56] References Cited

U.S. PATENT DOCUMENTS

| | | |
|---|---|---|
| 1,387,930 | 8/1921 | Kingsbury et al. |
| 1,666,521 | 4/1928 | Allen |
| 2,102,534 | 12/1937 | Howarth ............................ 308/160 |
| 3,081,682 | 3/1963 | Khoury .................................. 95/45 |
| 3,186,774 | 6/1965 | Wilcox .................................. 308/5 |
| 3,246,936 | 4/1966 | Carle ................................. 308/160 |
| 3,368,850 | 2/1968 | Wilcox .................................. 308/5 |
| 3,389,625 | 6/1968 | Wagner ................................. 82/2 |
| 3,432,213 | 3/1969 | Adams .................................. 308/5 |
| 3,508,430 | 4/1970 | Edmondson ......................... 72/456 |
| 3,578,827 | 5/1971 | Smith .................................... 308/5 |
| 3,619,013 | 11/1971 | Jones ................................. 308/3 A |
| 3,841,719 | 10/1974 | Smith ................................ 308/5 R |
| 4,099,800 | 7/1978 | Bell et al. ........................ 308/3 A |

FOREIGN PATENT DOCUMENTS 1054899  1/1967  United Kingdom .
1076227  7/1967  United Kingdom .

*Primary Examiner*—Lenard A. Footland
*Attorney, Agent, or Firm*—Gausewitz, Carr, Rothenberg & Edwards

[57] ABSTRACT

This invention provides an air bearing system for guiding along one of two opposed walls by a piston-mounted air bearing. A second piston-mounted air bearing is adjacent the other of the opposed walls, having a larger piston to exert a greater force and cause the first piston to bottom against a stop. The bearings receive air pressure along their inner surfaces for balancing the load on them and avoiding distortion.

13 Claims, 5 Drawing Figures

U.S. Patent   Mar. 29, 1983   Sheet 1 of 2   4,378,134
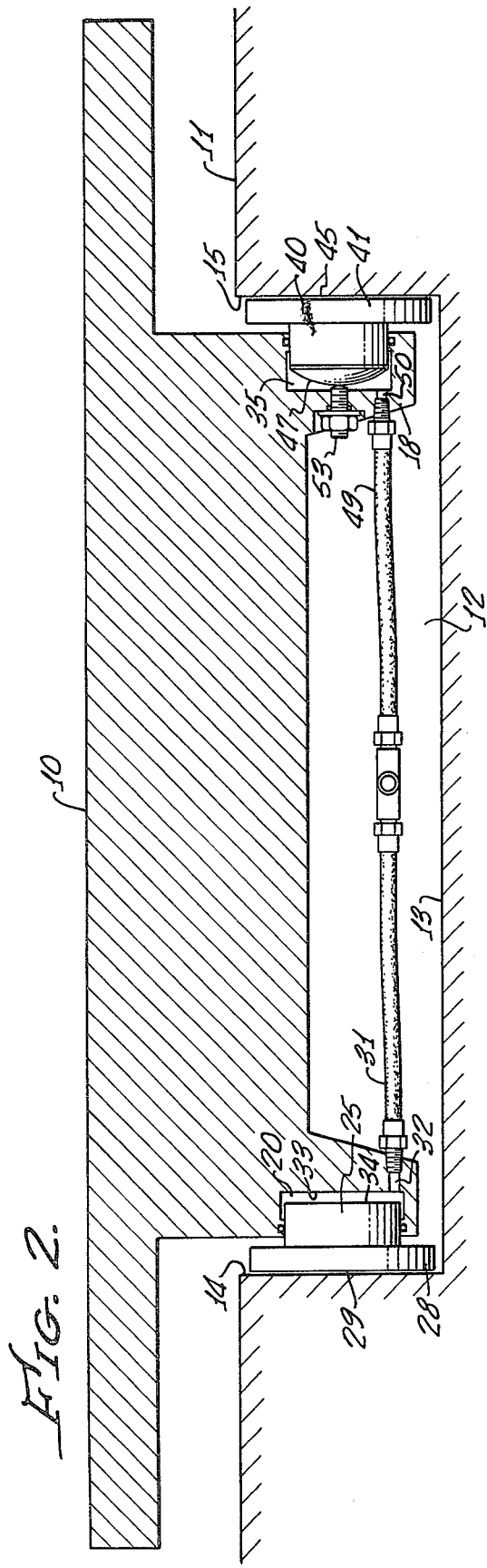
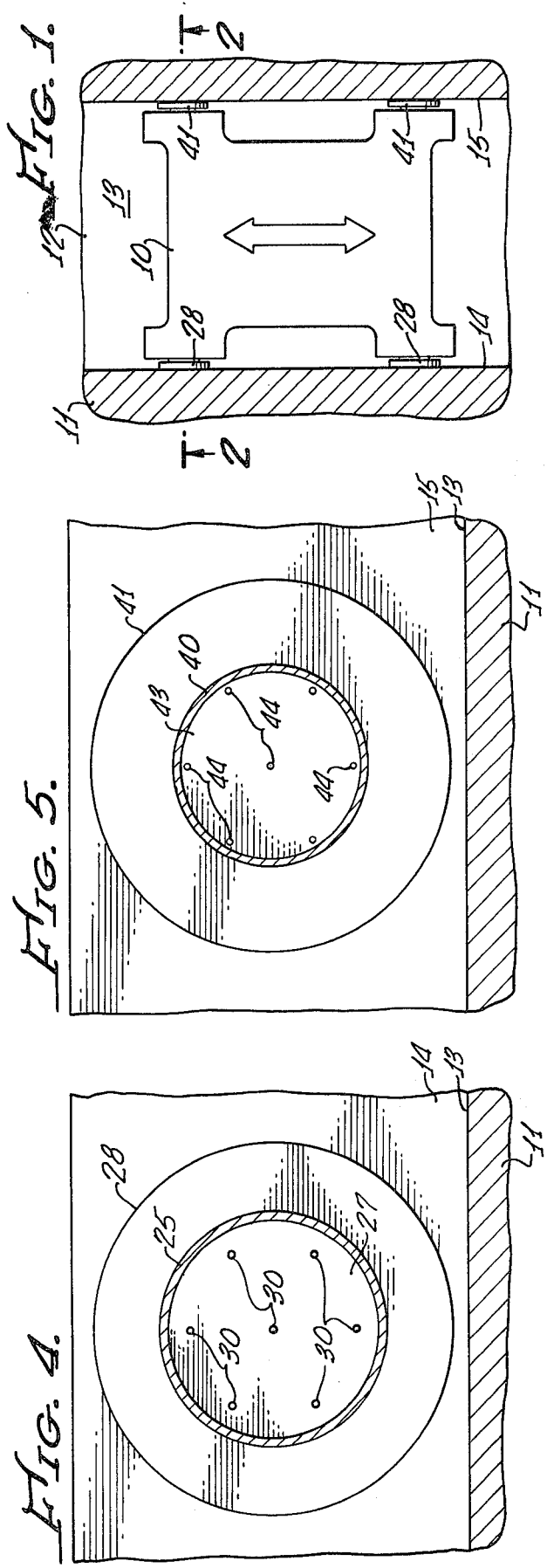

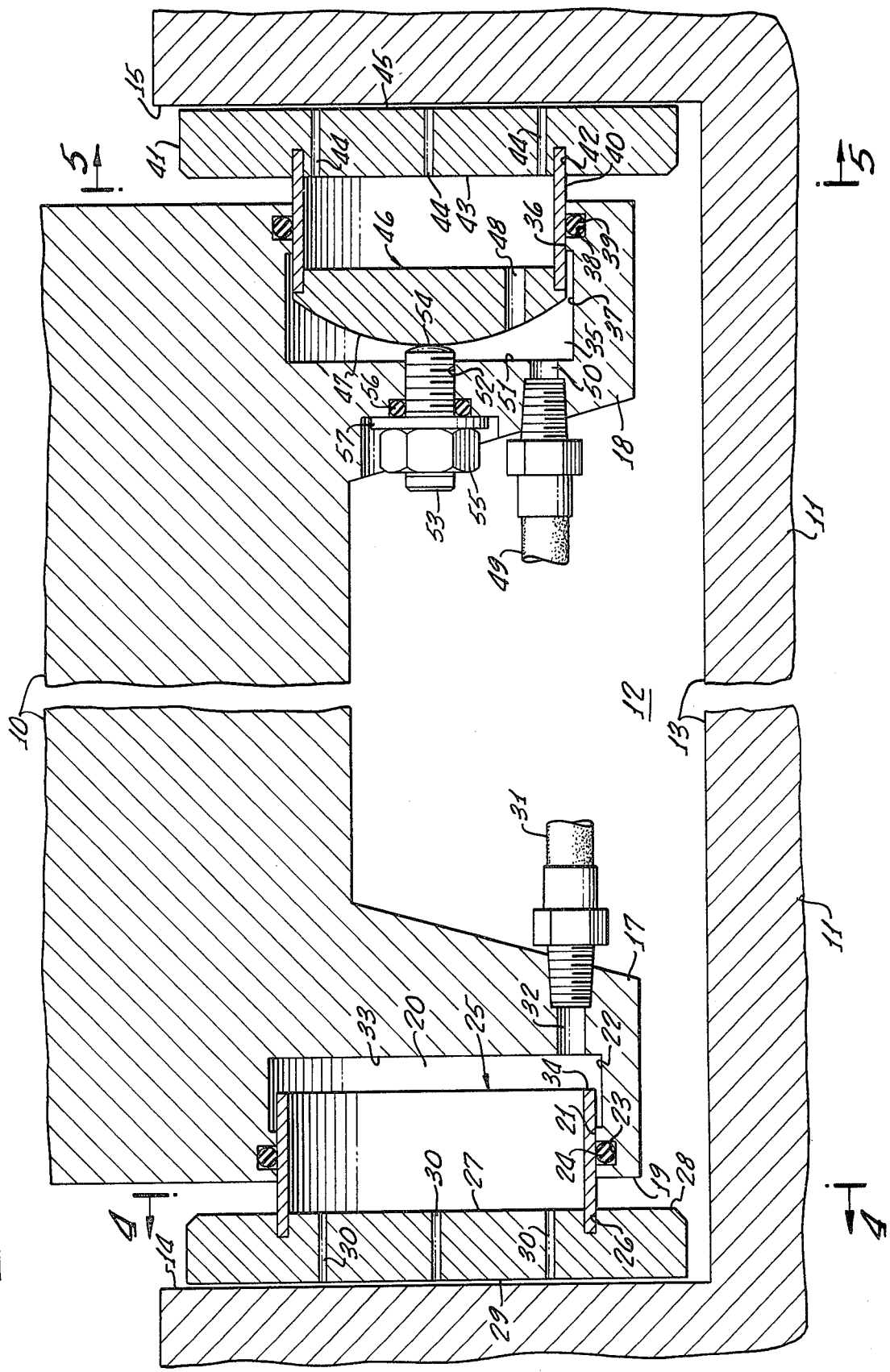

AIR BEARING GUIDE SYSTEM

BACKGROUND OF THE INVENTION

An accurate guiding system suitable for obtaining precise movement of the carriage of a machine tool is disclosed in U.S. Pat. No. 3,578,827. In this arrangement, two bearings are carried by one component of the system and positioned adjacent two opposed walls of a second component with respect to which their is to be relative movement. One of the bearings is rigidly mounted on the first component and positioned adjacent one of the walls, which is made to an accurate dimension. The other bearing is adjacent the opposite wall and is connected by a spring to the first component. This provides the second bearing with freedom to float, so that as the components move relative to each other, the path of movement is controlled by the rigidly mounted bearing and the first wall as the second bearing floats to accommodate dimensional differences. The resulting system allows a very accurate and relatively long path of movement to be achieved at a reasonable expense.

There are certain limitations to the prior art construction, however. The use of a spring provides a varying force, not necessarily entirely uniform, as the bearing floats and the spring deflects. The bearing shoe has uniform loading on one side where the air is discharged at the bearing surface, while the other side has a point or localized load where it is engaged with the spring in one case or the rigid mounting means in the other. This means that the bearing shoe tends to deform, unless made quite heavy. Even then, some distortion is unavoidable. Deformation of the bearing can result in variation in the lift height accomplished by the air discharged through the bearing. Contact between the bearing and the wall may result if the lift height is too small, thereby resulting in failure of the bearing to perform its function. This design requires a relatively high degree of parallelism between the two opposed surfaces to avoid changes in the lift of the bearings and the risk of contact between a bearing and the adjacent surface.

BRIEF SUMMARY OF THE INVENTION

The present invention provides an improved bearing system overcoming the difficulties of the prior art noted above. In this arrangement the bearings are more uniformly loaded, and the floating bearing has a considerably higher increment of permissible travel without incurring any change in the amount of lift, than is characteristic of prior art designs.

When the system is applied to a machine with a movable carriage, the floating bearing includes a cylinder in the carriage which receives a sleeve that extends from the bearing, so that the area encompassed by the sleeve provides a piston. Air is discharged into the cylinder, reacting against the piston, biasing the bearing outwardly. A portion of this air also bleeds outwardly through openings in the bearing to form a film of air at the bearing surface, so that the air which loads the floating bearing also provides the lift for that bearing. The cylinder is relatively large in volume so as to form a plenum at constant pressure for supplying the air to the bearing surface. When deviations in contour are encountered, the bearing can move outwardly or be displaced inwardly against the biasing force of the air.

Preferably, there is a cylinder for the second bearing, with a sleeve from the bearing shoe extending into that cylinder. The cylinder of the second bearing is smaller so that the piston head of the second bearing is of lesser area than that of the floating bearing and the outward biasing force is not as great. Discharge openings through the second bearing provide an outlet for the air within the plenum of the second cylinder so that it can form a film between the bearing surface and the wall. The bearing area of the second bearing equals that of the first, and the air discharge openings have the same size and pattern. An adjustable stop limits the inward travel of the second bearing. The air supply to the second bearing is at the same pressure and preferably from the same source as that of the floating bearing.

When the system is in use, the compressed air against the piston heads provides a reaction on the carriage with a net force away from the floating bearing. This causes the bearing adjacent the accurate wall of the table to bottom out against its stop. The other bearing then is free to float inwardly and outwardly as deviations in contour are encountered. Because the bearing surface areas of the two bearings are the same, as are their orifice outlets, equal lifts are provided at the two bearings, and the carriage assumes a position of equilibrium.

Relatively large amounts of variations in wall contour and angle may be accommodated by the floating bearing, which at all times maintains the same lifting force. There is no danger of contact between the bearings and the walls. The bearings are uniformly loaded on both sides throughout major portions of their areas so that there is little tendency to distort them and they need not be made excessively thick and stiff. The increased amount of surface variation that may be tolerated means that is less expensive to form the opposed walls of the table, because not as much care is necessary in the formation of the wall along which rides the floating bearing.

BRIEF DESCRIPTION OF THE DRAWINGS

FIG. 1 is a top plan view of a machine tool carriage, movable with respect to a support table and guided by the air bearing system of this invention;

FIG. 2 is an enlarged transverse sectional view taken along line 2—2 of FIG. 1;

FIG. 3 is a further enlarged transverse section view of the air bearing arrangement; and FIGS. 4 and 5 are sectional views taken along lines 4—4 and 5—5, respectively, of FIG. 3.

DETAILED DESCRIPTION OF THE PREFERRED EMBODIMENT

As shown, the air bearing system of this invention is used in guiding the carriage 10 of a machine tool in a rectilinear path with respect to a fixed table 11, which may be made from a slab of granite. Bearings, not shown, support the carriage vertically with respect to the table 11. A channel 12 with a flat bottom wall 13 and opposed substantially parallel flat sidewalls 14 and 15 is formed in the table 11. In the construction of the table 11, the channel sidewall 15 is made to precise dimensions so that it is close to being exactly planar. The surface 14, however, is not made to such close tolerances and so is not as close to being planar as is the surface 15. This means that there are slight differences in the spacing and angularity of the surfaces 14 and 15 throughout the lengths of these surfaces, and that the surfaces 14 and 15 are approximately, but not entirely, parallel.

Four bearings are used in guiding the carriage 10 in its fixed horizontal path, two on one side and two on the other. The two bearings on each side are identical so only one of each is shown and described in detail.

The carriage 10 includes depending flanges 17 and 18 along its sides adjacent the surfaces 14 and 15, respectively. Extending inwardly from the wall 19 of the flange 17, which is adjacent the table sidewall 14, is a cylinder 20. The axis of the cylinder 20 is perpendicular to the wall 19 and hence to the channel sidewall 14. The circumferential wall of the cylinder 20 is stepped, having a short entrance portion 21 which is slightly smaller in diameter than the inner portion 22. An annular recess 23 in the entrance portion 21 receives an O-ring 24. The latter element engages and seals against a cylindrical sleeve 25, one end of which is slidably received in the cylinder 20. The outer end of the sleeve 25 fits within an annular groove 26 in the inner surface 27 of a bearing shoe 28. The latter member is a flat, circular plate having an outer bearing surface 29 adjacent the table sidewall 14. The outside diameter of the bearing shoe 28 is somewhat larger than that of the sleeve 25. Several small spaced openings 30 extend through the bearing shoe 28 within the circumference of the sleeve 25, providing communication between the cylinder 20 and the outer surface 29 of the bearing.

Compressed air is supplied to the cylinder 20 through a line 31 which connects to a passageway 32 in the carriage flange 17 that empties into the cylinder at its inner end 33. This means that air can flow from the line 31 into the cylinder 20 to be discharged through the restricted openings 30 in the bearing shoe for providing a film of air between the bearing surface 29 and the table wall 14. The cylinder 20 and interior of the sleeve 25 are of relatively large volume and so form a plenum for the air so that there is a constant supply at a predetermined pressure for the openings 30.

The portion of the inner surface 27 of the bearing shoe 28 within the sleeve 25, and the inner end edge 34 of the sleeve 25, act as a piston head, so that the pressure of the air within the cylinder 20 biases the bearing shoe 28 outwardly toward the table sidewall 14. An equal and opposite reaction is exerted on the carriage 10, urging it away from the wall 14.

On the opposite side of the carriage 10 at the flange 18 is a second cylinder 35, which has an entrance 36 and a larger inner circumferential wall 37. The axis of the cylinder 35 is aligned with the axis of the cylinder 20 and is perpendicular to the sidewall 15 of the table. The entrance 36 and inner wall 37 of the cylinder 35 are of smaller diameter than the corresponding walls 21 and 22 of the cylinder 20. An annular recess 38 in the entrance wall 36 receives an O-ring 39. This provides a seal around a sleeve 40 of cylindrical shape which is movable axially relative to the cylinder 35. The sleeve 40 is smaller in diameter than the sleeve 25 in the cylinder 20.

A bearing shoe 41 has an annular recess 42 in its inner surface 43 which receives the outer end of the sleeve 40. Openings 44, within the sleeve 40, extend through the bearing shoe 41, providing communication between the inside of the sleeve 40 and the outer surface 45 of the bearing shoe which is adjacent the table wall 15. The openings 44 are the same in number, size and spacing as are the openings 30 in the bearing shoe 28. The outside diameter of the bearing shoe 41 is the same as that of the bearing shoe 28, which means that the bearing surfaces 29 and 45 have the same area.

The inner end of the sleeve 40, within the cylinder 35, carries an end plate 46 which has a domed surface 47 exteriorly of the sleeve. A passage 48 extends through the end plate 46. This allows for the transmission of air to the bearing shoe 41 from a line 49 that connects to a passageway 50 in the carriage flange 18, which in turn communictes with the cylinder 35 at its inner end wall 51. Therefore, air can flow from the line 49 through the passageway 50 and the opening 48 in the end plate 46 into the space within the sleeve 40. Air from this plenum can flow outwardly through the restricted openings 44 and the bearing shoe 41 to form a film between the outer bearing surface 45 and the table wall 15.

Air from the line 49 also reacts against the piston head formed by the portion of the bearing shoe within the sleeve 40 and the peripheral area of the domed surface 47 beyond the sleeve end to bias the bearing 41 toward the table wall 15. This force is less than the biasing force on the bearing 28 because the sleeve 25 is of greater diameter than the sleeve 40 and results in a piston head of larger area for the bearing 28. The equal and opposite reaction against the carriage 10, urging it away from the wall 15, therefore, is less than the reaction biasing the carriage away from the wall 14.

A threaded opening 52 in the carriage flange 18 communictes with the inner end wall 51 of the cylinder 35 at its center and receives a threaded stud 53. The end 54 of the stud 53 within the cylinder 34 is engagable with the center of the domed outer surface 47 of the end plate 46. Therefore, the stud and end plate 46 act as a stop which limits the travel of the sleeve 40 and the bearing shoe 41 toward the inner end 51 of the cylinder 35. The axial position of the end 54 of the stud 53 is adjustable by rotation of the stud, and the stud is held in its adjusted position by a nut 55 on the stud. An O-ring 56, beneath the washer 57, seals around the periphery of the stud 54 to prevent air flow.

In use of the air bearing system of this invention in guiding the carriage 10, a common source of compressed air is used to supply the lines 31 and 49 so that the same pressure is realized in the two cylinders 20 and 35. This air flows from the plenums formed inside the pistons within these cylinders through the restricted air outlet openings 30 and 44. This produces a thin film of air between the outer surface 29 of the bearing 28 and the table wall 14 and a similar film between the outer surface 45 of the bearing 41 and the table surface 15. Because the air orifices and the bearing surface areas of the two bearings 28 and 41 are the same, equal lifts are produced by the two bearings, and the carriage 10 assumes lateral equilibrium between the table walls 14 and 15.

Internally, however, the larger piston area within the sleeve 25 of the bearing 28, compared with that within the sleeve 40 of the bearing 41, produces a net lateral reaction on the carriage 10 biasing it in the direction of the wall 15. This force on the carriage causes the sleeve 40 to be pressed into the cylinder 35 so that the end plate 46 of the bearing 41 bottoms out against the stud 54, as shown in FIG. 3. Thus, there is a solid connection between the carriage 10 and the bearing 41 through the stud 54, the end plate 46, and the sleeve 40.

The other bearing 28, however, is free to float, as the sleeve 25 can move inwardly and outwardly. The bearing 28 also can tilt slightly relative to the carriage 10 by virtue of the clearance between the axially short entrance wall 21 of the cylinder 20 and the exterior surface of the sleeve 25. As a result, as the carriage 10 moves axially of the channel 12, it is guided entirely by the accurately formed wall 15, as the bearing 28 floats to accommodate any irregularities in contour, angle, or parallelism found in the wall 14. The air pressure is maintained at a constant value so that the lift and reactive force will remain constant, regardless of any variations in the channel walls.

Each of the bearing shoes 28 and 41 is uniformly loaded by air pressure along its inner surface within the sleeve. This load balances the pressure on the outer bearing shoe surface and assures that the bearing is virtually undistorted.

Inasmuch as the end plate 46 bottoms out against the stud 54 to form a solid connection as the bearing system is in use, the device may be constructed without a cylinder for the bearing 41, using a solid mounting istead. However, the use of a cylinder with uniform loading on both sides of the bearing contrasts with the point-type loading normally where a solid bearing mounting is used, with resulting distortion of the bearing shoe. Also, a relatively simple construction follows from the use of a pressure cylinder for the bearing 41, facilitating manufacture of the system.

Instead of being positioned against opposite walls of a channel, as described above, the bearings may be on opposite sides of an intermediate member, such as a beam. In that case the bearings face each other and the bearing surfaces are the opposite sides of the beam. The beam between the bearings may be the movable element while the bearings and their cylinders remain stationary, except for the movement of the pistons associated with the bearings. In that event, one of the beam walls is made to an accurate dimension and the opposite wall is not, so that the path of the beam is controlled by the accurate wall and the floating bearing responds to deviations in the opposite wall.

The foregoing detailed description is to be clearly understood as given by way of illustration and example only, the spirit and scope of this invention being limited solely by the appended claims.

What is claimed is:

1. A bearing system comprising
a first member defining first and second opposed rigid walls,
said second wall being relatively planar,
said first wall being approximately planar, but not necessarily as planar as said second wall, and being approximately, but not necessarily entirely, parallel to said second wall,
a second member,
said first and second members being relatively movable,
a first air bearing including a first flat bearing shoe,
a second air bearing including a second flat bearing shoe,
said first shoe having an outer surface adjacent said first wall and said second shoe having an outer surface adjacent said second wall,
a cylinder on said second member adjacent said first wall,
said first bearing including a sleeve having one end portion slidably received in said cylinder and an opposite end engaging and carried by said first shoe, whereby said first shoe can move toward and away from said second member, and said first shoe and said sleeve form a piston in said cylinder,
means for supplying pressurized air to said cylinder such that said pressurized air is within said sleeve and engages said first shoe for biasing said first shoe outwardly toward said first wall,
said first shoe having opening means for providing communication between said cylinder within said sleeve and said outer surface of said first shoe, so that said cylinder and sleeve act as a plenum for supplying air to said outer surface of said first shoe for forming a film between said outer surface of said first shoe and said first wall,
said second shoe including opening means for communicating with said outer surface thereof,
said means for supplying pressurized air including means for supplying said air to said opening means of said second shoe for providing a film between said outer surface of said second shoe and said second wall, and means for preventing said second shoe from moving toward and away from said second member, whereby said first and second members can be relatively moved in a path guided by said second air bearing along said second wall while said first air bearing moves toward and away from said second member in response to deviations in the contour of said first wall.

2. A device as recited in claim 1 in which said means for preventing said second shoe from moving toward and away from said second member includes
a second cylinder on said second member adjacent said second wall,
a second sleeve having one end portion slidably received in said second cylinder and the opposite end engaging and carried by said second shoe,
said second sleeve and second cylinder being of smaller diameter than said first-mentioned sleeve and cylinder, respectively,
said means for supplying air being connected to both said first and second cylinders to provide pressurized air in said first and second cylinders at the same pressure, whereby said pressurized air at said first cylinder produces a greater reaction than does said pressurized air at said second cylinder,
said second air bearing and said second member including interengagable stop means for limiting the movement of said second sleeve into said second cylinder and the relative movement of said first and second members toward each other at said second wall.

3. A device as recited in claim 2 in which said stop is adjustable for selectively varying said movement of said second sleeve into said second cylinder.

4. A device as recited in claim 2 in which said opening means of said first and second shoes include openings through said first and second bearing shoes, said openings being of the same size and pattern in said first and second bearing shoes, said outer surfaces of said first and second bearing shoes being of the same area.

5. A bearing system, comprising
means defining two opposed rigid walls,
the first of said walls being relatively planar,
the second of said walls being approximately planar, but not necessarily as planar as said first wall, and being approximately, but not necessarily entirely, parallel to said first wall,
a carriage for movement in a rectilinear path relative to said means,
a first and a second air bearing, each of which includes a flat bearing shoe, said shoe of said first bearing being adjacent said first wall and said shoe of said second bearing being adjacent said second wall, cylinder means on said carriage, said second bearing including means slidable in said cylinder means, and an inner surface communicating with said cylinder means and defining a piston head, means for supplying pressurized air to said cylinder, such that said pressurized air is engagable with said inner surface for biasing said second bearing shoe outwardly toward said second wall, and for producing an opposite reaction biasing said carriage away from said second wall, each of said bearing shoes having an outer surface and openings therethrough for providing air to said outer surface, said outer surfaces and openings of said first and second bearing shoes having the same area, said openings in said bearing shoe of said second bearing communicating with said cylinder means for receiving pressurized air therefrom, and means for supplying pressurized air to said openings in said first bearing at the same pressure as said compressed air supplied to said cylinder, whereby said bearing shoes provide equal lift and said second bearing shoe can move relative to said carriage in response to deviations in the contour of said second wall.

6. A device as recited in claim 5 in which said bearing shoe of said second bearing is a flat plate, said means slidable in said cylinder is a sleeve projecting inwardly from the inner surface of said flat plate into said cylinder, and said openings in said second bearing shoe are within said sleeve.

7. A device as recited in claim 5 including means on said carriage defining an addition cylinder, said first bearing having means slidable in said additional cylinder, and an inner surface communicting with said additional cylinder and defining a piston head, said means for supplying compressed air to said first bearing communicating with said additional cylinder and said openings in said shoe of said first bearing communicating with said additional cylinder, said piston head of said first bearing being smaller in area than said piston head of said second bearing, whereby said pressurized air in first-mentioned cylinder means produces a greater reaction on said carriage air than does said pressurized air in said additional cylinder means, and stop means for limiting the amount of movement of said first bearing inwardly relative to said carriage.

8. A device as recited in claim 7 in which said stop means is adjustable, whereby the amount of such movement inwardly of said first bearing is adjustable.

9. A bearing system comprising means defining two opposed rigid walls, the first of said walls being relatively planar, the second of said walls being approximately planar, but not necessarily as planar as said first wall, and being approximately, but not necessarily entirely, parallel to said first wall, a carriage for movement in a rectilinear path relative to said means, a first and a second air bearing, each of which includes a flat plate having an outer surface and an inner surface, and a cylindrical sleeve carried by said flat plate and extending from said inner surface thereof, each of said flat plates having a plurality of openings therethrough providing communication between said inner surface and said outer surface thereof, said openings through said flat plates of said first and second air bearings being equal in number, size and spacing, said outer surfaces of said flat plates being of equal areas, said outer surface of said first air bearing being adjacent said first wall and said outer surface of said second air bearing being adjacent said second wall, said carriage defining oppositely arranged first and second cylindrical openings therein, said sleeve of said first air bearing being slidably received in said first cylindrical opening, said sleeve of said second air bearing being slidably received in said second cylindrical opening, first seal means engaging the periphery of said sleeve of said first air bearing at said first cylindrical opening, second seal means engaging the periphery of said sleeve of said second air bearing at said second cylindrical opening, means for providing pressurized air at equal pressures to said first and second cylindrical openings for causing said pressurized air to flow through said openings through said flat plates for providing equal lift forces against the outer surfaces of said flat plates of said first and said second air bearings, and for exerting a force on said inner surfaces of said flat plates within said sleeves and on the end surfaces of said sleeves for biasing said flat plates of said first and second air bearings toward said first and second walls, respectively, and for producing equal and opposite reactions on said carriage biasing said carriage away from said first and second walls, said sleeve of said second air bearing being greater in diameter than said sleeve of said first air bearing, whereby a larger force is produced biasing said carriage away from said second wall than the force biasing said carriage away from said first wall for causing said carriage to move toward said first wall, said carriage and said first air bearing including interengageable stop means for limiting said movement of said carriage toward said first wall, whereby upon movement in said rectilinear path of said carriage the same is caused to follow the contour of said first wall while said second air bearing can move inwardly and outwardly with respect to said second wall.

10. A device as recited in claim 9 in which a common source of compressed air is connected to said first and second cylindrical openings.

11. A device as recited in claim 10 in which said stop means includes a member carried by said sleeve within said first cylindrical opening, and an adjustable member carried by said carriage and extending into said first cylindrical opening for engagement with said member, for thereby so limiting said movement of said carriage toward said first wall.

12. A device as recited in claim 11 in which said adjustable member is a threaded element received in a threaded opening in said carriage, whereby upon rotation of said threaded element the position thereof can be changed.

13. A device as recited in claim 12 in which said member carried by said sleeve of said first air bearing is a transverse member extending over the inner end wall of said sleeve of said first air bearing, said transverse member having an opening therethrough for transmitting said pressurized air to said flat plate of said first air bearing.

* * * * *